United States Patent Office 3,408,735
Patented Nov. 5, 1968

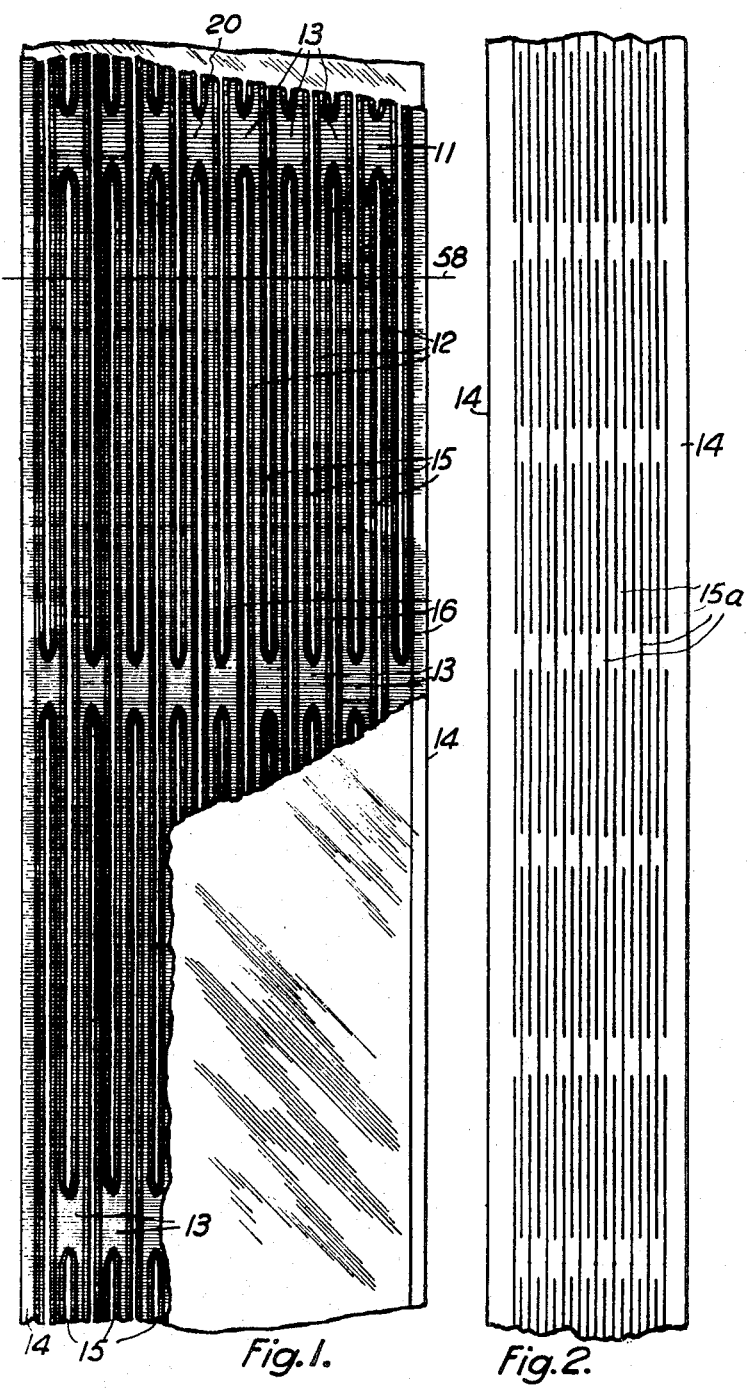

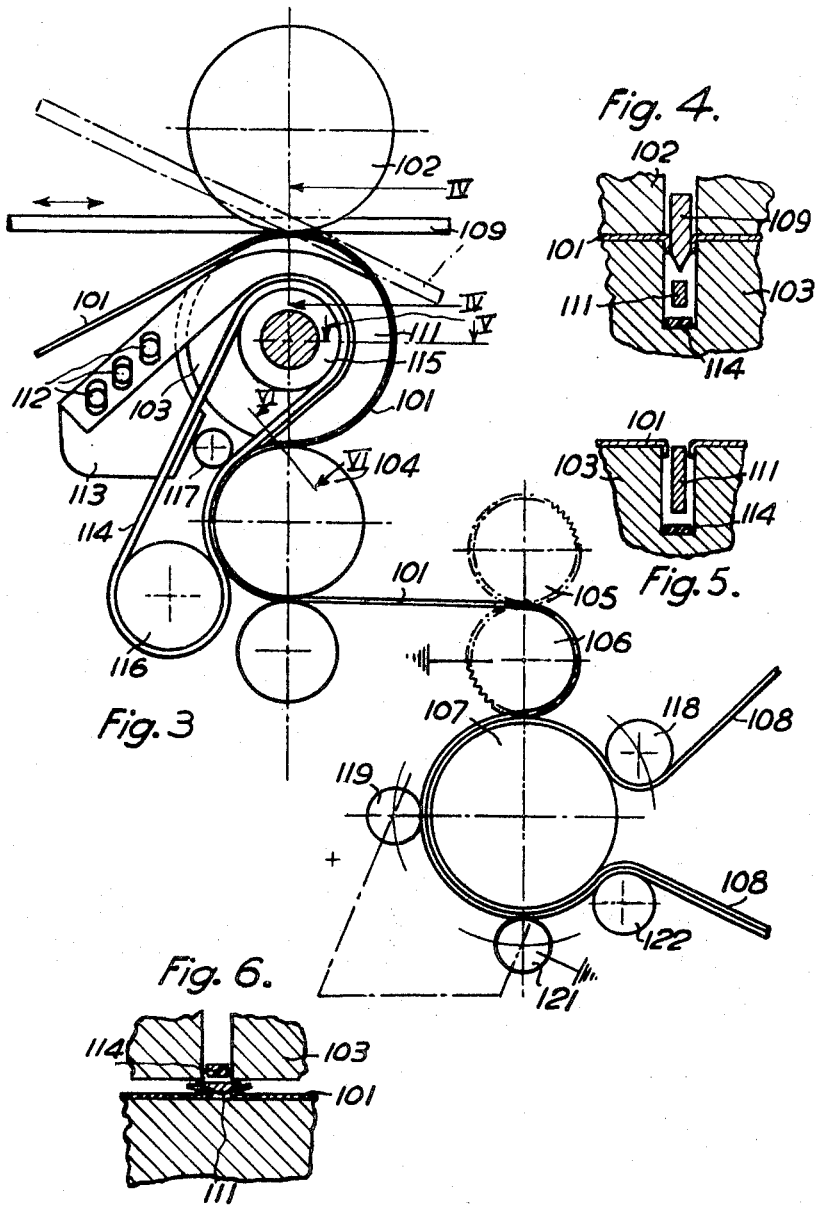

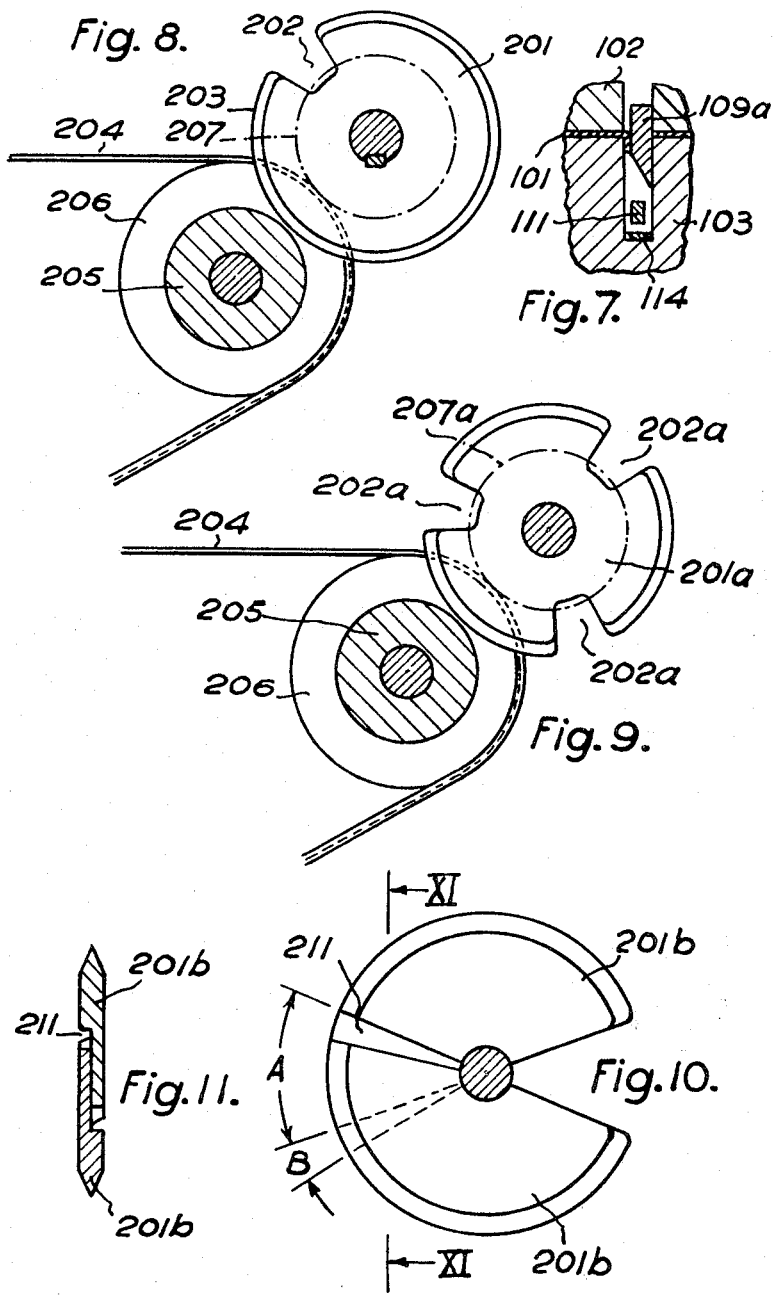

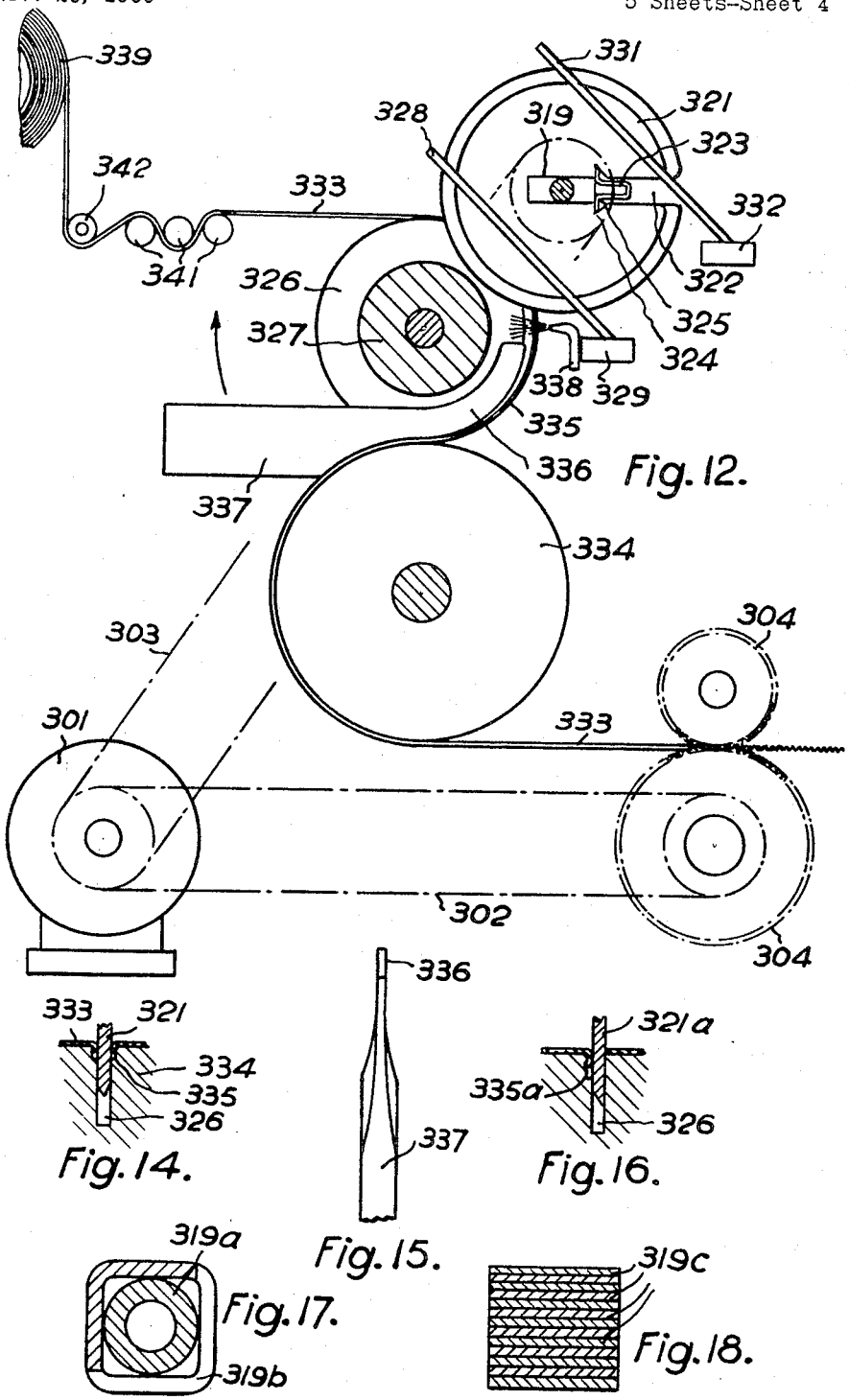

3,408,735
METHOD OF MAKING PATTERNED FOIL WEBS
Paul Eisler, 57 Exeter Road, London NW. 2, England
Continuation-in-part of application Ser. No. 165,736,
Jan. 12, 1962. This application Nov. 29, 1965, Ser.
No. 510,278
Claims priority, application Great Britain, Dec. 1, 1964,
48,780/64
17 Claims. (Cl. 29—610)

ABSTRACT OF THE DISCLOSURE

To produce lines of longitudinal slits the length of which can be varied in a regular pattern in a traveling web, suitably of metallic foil for the production of electric resistance heating films, a gapped knife for each limb which may be a rotating knife is given a cycle of movements, the gap remaining clear of the web at intervals to leave bridges between the slits and the longitudinal component of movement of the knife being variable to vary the length of the slits. The knife may also fold the margins of the slit through 90 degrees, these margins then being folded right over. The foil may be crimped and be insulated. Apparatus for producing the slits comprises gapped rotary knives, mounted on a non-circular shaft. The gaps may be adjustable and the shaft section may vary or be variable along its length to control the phase relationship of the gaps in successive knives. The driving gear may vary the speed cylically during each revolution.

---

The present application is a continuation-in-part of my application Serial No. 165,736, filed January 12, 1962, for Electrical Heating Film, since matured into Patent No. 3,283,284.

The invention relates to the production of a material in thin web form having a pattern of at least one series of longitudinally aligned slits with interruptions.

One object of the invention is to provide a method and an apparatus for producing such a pattern which lends itself to continuous high speed production in which the length of the slits can be varied without the need to exchange the cutting tool (which is preferably a rotary knife) and without the need to have a fixed ratio between the length of the slits and the length of the interruptions.

The method according to the invention whereby this object is achieved includes the steps of feeding the web longitudinally through a cutting station, and while the web is in motion through the station, imparting a repeating cycle of movements to a knife having a cutting edge with at least one gap therein, said cycle including a movement of the knife in fixed ratio to the movement of the web while the gap in the cutting edge is passing over the web and a movement of the knife controllable independently of the movement of the web while the cutting edge makes an incision in the web.

During that phase of the cycle in which the gap is passing over the web, when the incision is terminated and/or commenced, the longitudinal component of the speed of the knife may be substantially equal to the speed of the web and the relative movement between the cutting edge of the knife and the web is substantially perpendicular to the web. Then length of the interruption will be substantially equal to the length of the gap. During the phase of the cycle in which the knife is making the incision, at least one acceleration and one deceleration are included in the movement of the knife. The length of the incision can thus be regulated by the choice of the acceleration and deceleration, independently of the length of the interruptions.

The motion imparted to the knife may always be in the same direction during at least one cycle whereby the incision is started by one end of the cutting edge and terminated at the other end of the cutting edge, while provision is made to regulate the mean speed of the knife during the cycle in relation to the speed of the web. The movement of a rotary knife can remain in the same direction during all the cycles of operation. Such a rotary knife can be circular or non-circular. The length of the slit plus the length of the interruption is determined by the mean speed of rotation of the knife in relation to the rate movement of the web; by including suitable values of acceleration and deceleration in the incising phase, it is still possible (within limits imposed by various practical considerations) to make slits of desired length with interruptions of constant length.

If the web is of very thin material it may be reinforced prior to slitting by lamination to a material such as paper or a film of synthetic material, or by a coat of lacquer, varnish or the like. The web is desirably held under tension during slitting.

Prior to slitting, the web may be lubricated with a lubricant compatible with any other materials with which the web is coated or laminated, or is to be coated or laminated following slitting.

It is often required to convert the pattern of slits into slots. My patent No. 3,283,284 aforesaid discloses a product in which this has been accomplished by folding over at least one and preferably both margins of the slit back on to the web. If the pattern of slits is made by a continuous method applied to a moving web drawn from a supply through a cutting station and the conversion into slots is to be made during the same cycle of operations alignment presents difficulties, and these difficulties becomes all the greater when the pattern includes a plurality of series of longitudinally aligned slots fairly close together side by side as in the case for example with an electrical heating film incorporating meander patterns for the current as will be described in greater detail below. To deal with the difficulties of alignment the invention provides for the web while being drawn from a supply such as a roll to be slit and the margins of the web on at least one side of each slit to be folded over through about 90°, and for the completion of the folding through 180° to be effected thereafter. Preferably the web is carried in a curved path during slitting when the partial folding is effected towards the concave side of the curved path and it then enters a second path of reverse curvature thereby bringing the folded margins on to the convex side of the reversed path so that the natural tension tends to complete the folding.

The apparatus for putting this method of slitting and folding into operation includes means for continuously feeding the web, means for slitting the web longitudinally at intervals of length and partly folding over the margin of the web at least on one side of each slit, and means for completing folding over of the partly folded margin, the means for slitting and partly folding over including at least one common member whereby alignment between the slitting and this part of the folding is directly ensured.

The common member is suitably a grooved support such as a roller over which the web passes, the groove serving to guide in its active position a knife which slits the web and in co-operation with one wall or preferably both walls of the groove effects the first part of the folding over. If one margin only is to be folded over, the cutting edge of the knife is disposed to lie close to one wall of the groove, the folding then being over the other wall, while if both margins are to be folded over the cutting edge is disposed between, preferably midway between the walls of the groove.

The means for completing folding may be mechanical or pneumatic or include both mechanical and pneumatic means. So far as mechanical means for this purpose is included, the grooves also serve to guide such means to ensure alignment thereof. Thus such mechanised means can comprise a plough member which extends along each groove to a position near the knife and serves to hold the partially folded margins in position. Beyond the grooved roller and in the region in which the web leaves it, the plough member incorporates a widened shoe which serves to continue the folding over of the web margins to a position parallel to the unfolded part of the web i.e. in general through 180° so that the folded over margins are folded over on to the web. Between the position where the web leaves the knives and encounters the ploughs, unfolding may be prevented by pneumatic means such as a jet of air and such jets may replace any or all of the length of the plough. Such means can even replace the shoes.

The knives used may be straight or circular knives which are lifted to produce the interruptions between the slits, or they may be rotary knives preferably circular knives with gapped cutting edges to produce the interruptions as above described. Such knives may be individually easily exchangeable and they may be retained in their correct planes by guides which themselves can be located from the grooved support.

Electric heating films to the production of which the present invention is especially applicable, have a plurality of series of aligned longitudinal slots side by side, alternate series being relatively staggered longitudinally, usually by about half a pitch, where pitch equals slot length plus bridge length, the web consisting of or incorporating a layer of electrically conductive material so that the slots leave a multiplicity of electrically conductive meander patterns across the web. Such a web can be cut up into individual pieces including one or more repeats of the meander pattern and if a continuous conductive margin of adequate cross section is left on each side to serve as a bus bar or terminal the meander patterns will be electrically in parallel across the margins and if the meander pattern presents a suitable resistance, the individual pieces of web can serve as electrical heating films which if the pattern repeats are identical will have a uniformly distributed constant surface loading when a supply is connected to the margins. For many purposes such a pattern can be designed to operate on a supply voltage (below 50 volts) which is free from danger if human contact should accidentally be made to the conductive material.

Further objects and features of the invention will appear from the following description with reference to the accompanying drawings.

The drawings are highly diagrammatic and the proportions are exaggerated especially as to the thickness of the web and its associated layers, in order to make them clearer. In the drawings:

FIGURE 1 is a plan view of a very short portion of a heating film material as produced in accordance with the invention, made in considerable length, and from which separate heating films containing any desired number of repeats can be cut.

FIGURE 2 is another plan view on a smaller scale than FIGURE 1 to illustrate a large number of repeats and to show a pattern of slits without any folding over.

FIGURE 3 is a side view of a machine which may be used for the continuous production of the film according to the invention.

FIGURES 4, 5 and 6 are detail sections on the lines IV—IV, V—V and VI—VI respectively of FIGURE 3.

FIGURE 7 illustrates an alternative form of knife for use in the machine of FIGURES 3 to 6.

FIGURE 8 illustrates the use of a circular knife having a single gap in its cutting edge.

FIGURE 9 illustrates the use of a circular knife with more than one gap in its cutting edge.

FIGURES 10 and 11 show in side end section on the line XI—XI of FIGURE 10 the construction of a composite knife having an adjustable gap in its cutting edge.

FIGURE 12 is an end view of a form of operation according to the invention using circular knives with gapped cutting edges, which enables the length of the slits to be varied independently of the length of the interruptions.

FIGURE 14 is a detail section illustrating the action of the knife.

FIGURE 15 is a detail plan illustrating the action of a shoe which completes the folding of the margin of the slits.

FIGURE 16 is a similar view to FIGURE 14 showing a different profile of knife.

FIGURES 17 and 18 are cross-sections of two forms of knife shaft enabling adjacent knives to be relatively adjusted angularly.

Figure 13:
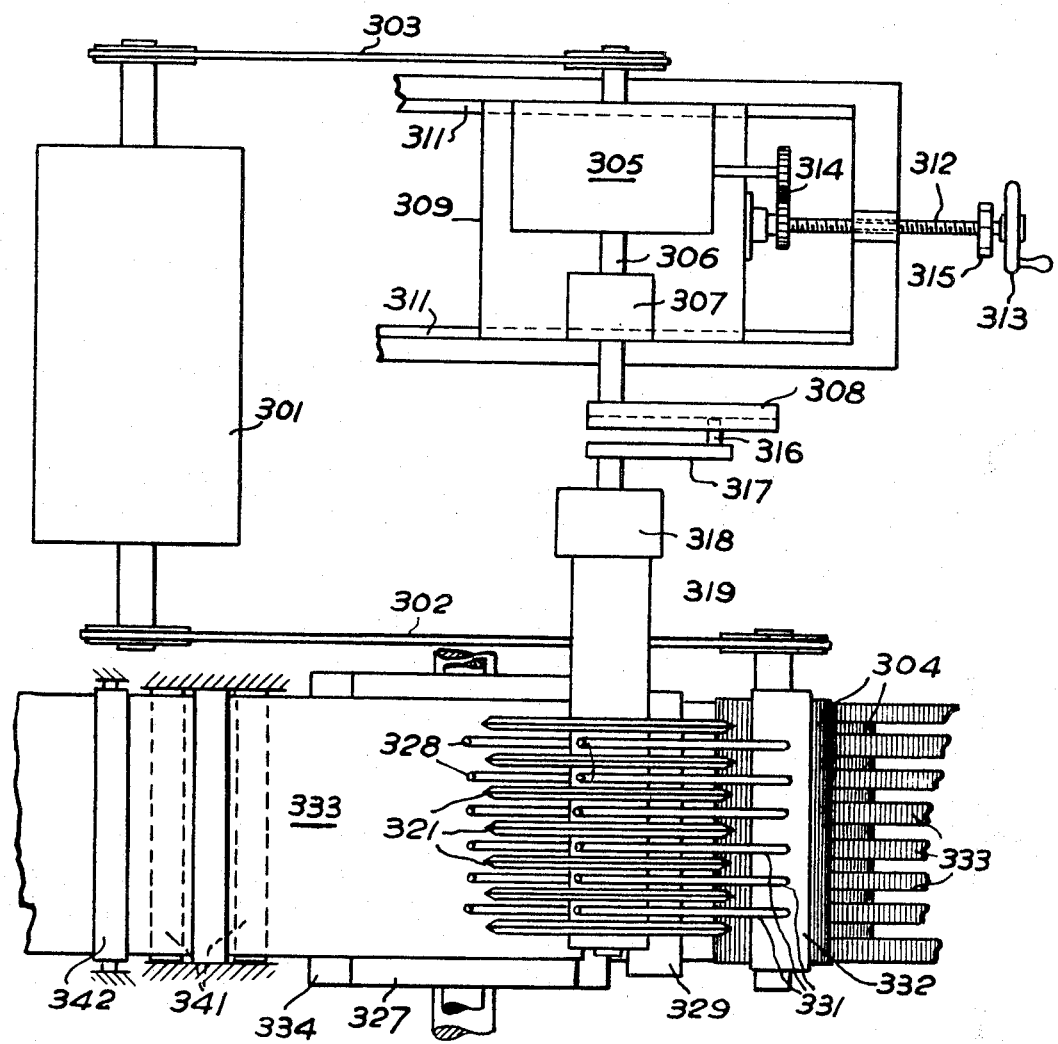
FIGURE 13 is a plan view of FIGURE 12.

The example chosen for illustration in FIGURES 1 and 2 is an electric heating film which shows a longitudinal repeating meander pattern so that there are a plurality of series of relatively staggered slots side by side. There are bridges between the slots and the bridges in alternate series are relatively staggered longitudinally by substantially half a pitch and with transverse rows of bridges perpendicular to the length of the film. As will be explained, it is also possible within the scope of the invention to arrange the transverse rows at an inclination or to produce more elaborate dispositions of the bridges and of the meander patterns. Again the invention is also applicable to but a single series of slots or to a plurality of a series of slots all in phase, and to the production of similar patterns to slits without folding over of the margins to convert the slits into slots.

An essential part of a heating film is the conductive foil.

Though in some cases the film may consist of no more than the bare foil pattern suitably held, usually it will be insulated on one or both sides and on the folded margins.

The conductive foil preferred in most applications of the heating film is aluminium foil of about or less than 0.002 inch (0.05 mm.) thickness.

A convenient standard width of arm is then ⅛-inch (3 mm.) but patterns have successfully been made with arms as little as 1/16-inch (1.5 mm.) wide. There is no difficulty in making them wider if desired, and a machine can readily be constructed on the lines described later which enables the width to be adjusted in multiples of say ⅛-inch. The aluminium foil may be provided on one side over all or selected parts with a conductive coating, e.g. a readily solderable alloy or a conductive adhesive film which makes connection of selected areas to other conductive surfaces easier, and/or on the other side with an insulating varnish, lacquer, or anodic film, thus constituting a very thin double or triple layer material.

The scope of the invention is, however, not restricted to this foil and covers practically any metallic foil, and can be applied also to electrically conductive film material other than metallic foil and which the term "foil" used in this specification is intended to cover for instance carbon or ultra-fine metal-powder-coated insulating film the coating of which has a desired resistance value and characteristic. The expression "foil" is generally used for metal strip up to 0.006 inch (0.15 mm.) thickness, but for some metals a somewhat thicker strip is still referred to as foil. The present specification uses the term foil in the same sense in relation to metallic foil. Hereinafter only metallic foil will be referred to.

For applications in which the heating film reaches a temperature in excess of that easily tolerated by a convenient insulating covering, or where irrespective of temperature reached by the film the delicate metallic foil pattern is not exposed to damage by outside forces and can be adequately supported, the preferably crimped metallic foil pattern is not sandwiched between insulating layers, but used without such layers. The maintenance of the spacing of the arms is however not relied on alone for preventing shortcuts, and as mentioned above the metal foil is either lacquered or varnished at least on the surface forming the outside of the folded-over edges, or anodised, if it is of aluminum.

The electrical heating film shown by way of example by FIGS. 1 and 2 which illustrates part of a film made in lengths only limited by the length in which the component materials can be obtained, comprises a conductive foil 11 which is slit longitudinally into parallel narrow arms 12 forming in conjunction with bridges 13 joining the ends of the arms, a succession of meander paths between the first and last arms constituted by the margins 14 which are of greater width than the arms 12, and which can constitute busbars. The slits 15a between the arms are widened into openings or slots 15 by the margins of the arms being folded over and flattened back on to the arms as at 16. Preferably, the one surface of the foil which is on the outside of the folds at the margins is lacquered, varnished, anodised in the case of aluminum foil, or otherwise covered with an insulating layer so that the neighbouring folded margins of adjacent arms are not only spaced from each other by the width of both folded-over edges, but also have two layers of insulation between them which prevents a short-cut of the electrical path intended to extend through the full length of the meander arms, if neighbouring arms should for instance accidentally contact each other at their folded-over margins. A pinhole or other failure of the insulating layer covering any folded-over margin is unlikely to occur just opposite to a corresponding failure in the insulating layer on the opoiste folded-over margin of the neighbouring arm.

An insulating film 21 of plastic or elastomeric material, of paper or textile, including glass or quartz fibre cloth, may cover one or both sides of the patterned foil, and these insulating coverings may extend into the slots between the meander arms in and beyond the plane of the metallic foil, so that they solidly fill the spaces between adjacent arms. If plastic or elastomeric materials are used as both top and bottom coverings of the foil pattern their junctions through the spaces between the arms of the pattern can be effected by welding while when these films are layers of paper or textile, adhesives or sewing stitches can be used for joining top and bottom insulating films in the spaces between the arms and, where desired, along and beyond the outside edges of the foil pattern.

Anodized aluminum foil tapes having their margins folded over have been proposed for magnet windings but the methods used for folding the margins are not applicable to the heating film with its closely spaced lines of interrupted slits. The present invention provides a method in which the foil drawn continuously from the roll is slit and the margins of the foil on at least one side of each slit are by the slitting operation itself folded through about a right angle and folding of the margins through 180° i.e. back on to the arms, is completed immediately thereafter. Preferably the foil is carried in a curved path during slitting when the partial folding is effected towards the concave side of the curved path and it then enters a second path of reverse curvature thereby bringing the folded margins on to the convex side of the reversed path so that the natural tension tends to complete the folding.

The invention further provides apparatus for putting this method into operation which includes means for continuously feeding the foil, means for slitting the foil longitudinally at intervals of length and partly folding over the margins of the foil on at least one side of each slit, and means for completing the folding over of the margins on to the surface of the foil, the slitting means and folding means including at least one common member whereby alignment between the slitting and folding is directly ensured. In this way the problem of alignment which is a serious one with many narrow arms side by side is solved without the necessity for minute adjustments which could go out of order. The common member may be a grooved roller over which the foil passes, the roller having a plurality of grooves at least some of which each guides in its active position one of a plurality of knives which slit the foil and in cooperation with the walls of the groove effect the first part of the folding over of the margin(s) of the foil at the sides of the slit. Each groove which guides a knife also guides one of a plurality of shoe members incorporating each a widened part projecting beyond the roller in the region where the foil leaves it and serving to continue the folding over of the margin(s) of the foil. The interruptions in slitting are obtained by the provision of means to lift each knife into an inactive position at intervals and for guiding it when in this position to remain in line with its groove in the grooved roller. This guiding means can be a stationary comb-like guide corresponding with the grooved roller or it may be another grooved roller pressing against the first grooved roller with the foil between at the region where the slitting is effected.

An example of a machine working on the above lines and provided with further devices necessary for producing a heating film such as that shown in FIGURE 1 in continuous lengths, that is in lengths only limited by the length in which material can be supplied to it, is shown in FIGURES 3 to 7.

In this machine for example aluminum foil 101 lacquered on one side, coming from a stock roll not shown, passes lacquered side upwards, between two grooved rollers 102, 103. The grooves in the two rollers are opposite one another. Their centre to centre spacing is equal to the minimum width of the arms to be produced and the width of each groove is equal to twice the width of each margin to be folded over at each slit. These rollers can conveniently be built up of discs and spacers.

From the roller 103 the foil passes over a solid roller 104, and between crimping rollers 105, 106. Thereafter in this example it passes over a drum 107 where an insulating covering 108 drawn continuously from a stock roll not shown, is laminated to the lacquered side of the foil.

The grooves in the rollers 102, 103 serve to guide in all positions, knives 109 which are moved between an inactive position shown in solid lines in which the edge of the knife just clears the foil, and an active position shown in chain lines in which the knife slopes downwardly beyond the nip of the rollers 102, 103 and into the groove in the roller 103. In place of the roller 102, a stationary comb-like guide corresponding with the roller 103 could be used to cooperate with roller 103 in guiding the knives as described below with reference to FIGURES 12 to 15. The lower edge of the knife is sharp along the centre lin (see FIGURE 4) so that it slits the foil. Its section is straight sided and its thickness is less than the width of the groove by twice the thickness of the foil (plus such working clearance as may be necessary), so that the grooves themselves align the knives and the slit is necessarily along the centre of the foil overlying the groove and the section of the knife necessarily folds the margins of the slit foil over the sides of the groove i.e. through 90° towards the concave side of the path of the foil over the roller 103. The nip of the rollers 102, 103 relieves the foil of stresses during slitting.

Stationary ploughs 111 extend into the grooves in the roller 103 and they are shaped while clearing the knives 109 to follow the latter to retain the partly folded foil against the sides of the grooves. Where the foil leaves the roller 103, the shoes project into the space between the rollers 103, 104 on the lefthand side of the point where the foil passes from the one roller to the other and they are here widened into shoes, see FIGURE 6.

In passing from the roller 103 to the roller 104 the 90° folds come on the outside of the roller 104 and the shoe continues the fold beyond the 90°. The reversal of curvature of the foil when it runs over the roller 104 puts the folded part into tension and this assists in completing the folding of the margins while the action of the ploughs also ensures that the folding is continued and is not reversed i.e. the foil is not unfolded back into its original position.

To permit adjustment of the ploughs, they are slotted and held by bolts 112 to their support 113.

The figure shows the roller 104 running against the roller 103 but they could be slightly spaced, the shoes being correspondingly shaped.

In the example, endless rubber-covered wires 114 run over loose discs 115 in the grooves in the roller 103 and over a guide roller 116 while a pressure roller 117 squeezes the rubber against the foil passing over the roller 104 after it has left the shoes 111, and thus completes the flattening of the folded margins. Instead a simple pressure roller might be used, but both these devices can be omitted if the shoe is shaped to complete the flattening. Also as explained below with reference to FIGURES 12 and 13 the ploughs and shoes can be supplemented or replaced by pneumatic means.

If a pattern with the minimum width of arm is to be produced there is a knife and plough in every groove of the roller 103 but for wider arms a corresponding number of grooves is left without knives and ploughs. Thus arms of a width of any multiple of the minimum can be produced on the same machine without changing the grooved rollers, merely changing the number of knives and ploughs. Modifications of details of the machine are possible. Thus the knives might be set at the angle indicated for the active position in FIGURE 3 and be moved only longitudinally to bring them into the inactive position.

After being crimped between the rollers 105, 106 which may be constructed to leave an uncrimped zone or zones with the crimps 180° out of phase on the opposite sides of such a zone if necessary, the pattern and crimped foil has the insulating covering 108 laminated to it while passing over the drum 107 which may be heated or water cooled according to the requirements of the laminating process. This drum 107 is desirably adjustable a little towards and away from the lower roller 106 in order to prestress the crimped foil if the insulating covering 108 is not elastomeric. On its way to the drum 107 the foil or the covering 108 may be coated and dried if necessary. The covering is led to the drum over a tension controlling roller 118. It will be seen that the foil 101 lies on top of the covering 108 with its lacquered surface towards the latter. The bare foil surface is contacted by the crimping roller 106 and also by two further metallic rollers 119 and 121. The rollers 106, 121 are earthed while the roller 119 is connected to the live pole of a supply so that current flows longitudinally through the foil from the roller 119 to both the rollers 106 and 121 and thereby heats the foil sufficiently to effect a joint between the foil and the covering 108 which are held pressed together by their path round the drum 107. Some adjustment in the heating effect can be obtained by displacement of the rollers which supply the current, conveniently by mounting the rollers 119, 121 so that they can be displaced round the axis of the drum 107. On its path from the roller 121 to a further roller 122 the film is cooled and may pass to a re-reeling roller or to a coating or covering station at which the bare surface is insulated. It will be clear that instead of using the crimping roller 106 as one of the connecting means in this heating arrangement, a separate roller may be used and that instead of using rollers for making contact rods could be used.

To produce the pattern of arms as in FIG. 1 it is sufficient to divide the knives 109 into two groups of alternate knives and lift each group into its inactive position separately to leave the bridges. Any convenient means may be used for doing this, for example, a solenoid or air cylinder for each group controlled through switches themselves operated by a multiple (and preferably adjustable) cam geared to the roller 103. If more elaborate patterns are to be made each knife may be individually lifted into inactive position and lowered into active position by a separate solenoid, air cylinder or other device the pattern being determined by a pattern card or the like, after the fashion of a Jacquard, which may be sensed electrically or photoelectrically, or a moving master pattern geared to the roller and similarly sensed may be used. It is also desirable to impart to the knives a cyclic longitudinal motion, thereby to even out the wear on their cutting edges. The mechanism which lifts and lowers them can incorporate a linkage which does this.

If necessary or desirable the foil may be lubricated before slitting and folding as described later with reference to FIGURES 8 to 18 using a lubricant of the character also described later.

As shown in FIGURE 4, the knives are proportioned so that the slit is made midway between the walls of the groove in the roller 103. Thus the margins folded over on opposite sides are of equal width. The edge of the knife might however be asymmetrically disposed giving different widths of margin on opposite sides, or even as indicated in FIGURE 7 be at the side of the knife which is here marked 109a. In this case the slit is made by shearing in conjunction with the edge of the right hand wall of the groove so that no fold is made here, while the margin on the other side which is folded over has a width equal to the total width of the groove. The parts of the shoes 111 which project into the space between the rollers 103, 104 and which serve to continue the folding beyond 90° need only be shaped for the purpose on the one side.

It will be clear that in the machine above described with reference to FIGS. 3 to 6 the slit is started by inserting the knife into the groove and the slit is ended by lifting the knife out of the groove. Straight knives are therefore preferably made with a sharp point which can be moved in almost perpendicular direction into and out of the foil.

The knives could be moved in a cycle during which the incision is started by advancing the knife point into the groove and the incision is completed and the interruption produced by withdrawing the knife from the groove. By suitably controlling the cycle of the knife and suitably shaping the knife point, during the withdrawal or entry of the knife point when the incision is terminated or commenced, it can be arranged that the longitudinal component of the speed of the cutting edge of the knife is relatively equal to the speed of the web and the relative movement between the cutting edge of the knife and the web is substantially perpendicular to the web. The cycle of movement can provide for the knife to be moved longitudinally as well as with a radial component relative to the grooved support. In this case the knife can be regarded as a gapped knife, in effect the gap in the cutting edge being simply the space beyond the knife point. The two phases of the cycle of movement of the knife may be controlled so that the phase of the movement when the knife is clear, bears a fixed relationship to the movement of the web to give a fixed length of interruptions and so that during the incision phase the movement of the knife is controllable independently of the movement of the web to give a length of incision which can be varied. Thus the knife may be moved by the aid of relatively adjustable cranks and adjustment of the web feed as described below.

Instead of using straight knives rotary circular knives could be used in the above described machine, the knives being lifted at the requisite intervals to produce the bridges, and the knives also serving to effect the first 90° of folding. Such knives could rotate with a peripheral speed equal to the speed of the web or at a different speed. The same basic method of slitting and folding underlies the apparatus shown in FIGURES 8 to 18 but rotating circular knives with gapped cutting edges are here used which have among other advantages that they do not have to be raised to leave the uncut bridges, these here being produced by the gap in the cutting edges of the knives. As will be explained, not only can this apparatus produce a meander patterned foil (including the folded margins) at high speed with a remarkably small incidence of failure, but in its preferred form enables the repeat length to be varied very easily even during operation.

If as indicated in FIGURE 8 a single circular knife 201 having a gap 202 in its cutting edge 203 deep enough to clear the web is used for cutting each series or line of slits in the web 204, the length of the bridges is determined by the ratio of the speed at which the web is moving through the cutting station constituted by a roller 205 over which the web passes, with a groove to clear the knife edge, to the peripheral speed of the knife while the gap 202 in the cutting edge of the knife is passing over the web. It is preferred that this ratio should be unity, so that the knife and the web move at the same longitudinal speed, at least while the gap is passing over the web.

For high speed continuous production with the length of the slits constant, the peripheral speed of the circular knives and the speed of the web can remain equal throughout the cycle in which case the diameter of the knives at the circle 207 which touches the path of the web will be pitch/$\pi$ if there is only one gap as in FIGURE 8 or an integral multiple of this diameter with a corresponding member of equally spaced gaps. FIGURE 9 shows by way of example a knife in which the diameter of the circle 207a is 3 × pitch/$\pi$ and the cutting edge 203a has three equally spaced gaps 202a.

Where it is desired to provide for various slit lengths without a separate set of knives for each, means must be provided for variation of the relative speed of the web and the peripheries of the knives. There is thus relative longitudinal movement between the web and the periphery of the knife and this can be positive or negative thus increasing or decreasing the length of the slits. The former requires the knife to be slowed down, the latter is to be speeded up. A mere change of speed ratio which remains constant throughout the cycle would also alter the length of the bridges in the same proportion as the length of the slits, whereas it would usually be required to keep the length of the bridges constant because usually the electrical requirements relate the length of the bridges to the width of the arms of the pattern rather than to the length of the arms of the pattern.

One way of enabling the length of the bridges to be varied in relation to the length of the slits is to make up each knife of two approximately semicircular half knives 201b, FIGURES 10 and 11. Thus the length of the gap 202b can be varied by a relative angular movement of the two half knives, which can be locked together after adjustment by any suitable means such as a bolt engaging through arcuate slots in the half knives or means clamping the knives axially.

To enable the cutting edge to be continuous between the ends of the gap and to provide for folding in the manner to be described, the two half knives are cut away to half thickness over a sector 211 of angle A equal to the maximum overlap to be provided for. With less overlap there will be two corresponding angles B where the cutting edge will only be bevelled in one side and the composite knife will have a recess 211 on the other side but this will be quite short and will not prevent folding from being properly effected.

This composite knife arrangement avoids the need for a separate complete set of knives for every different slit length, but if a change is to be made every knife has to be separately adjusted. It is much preferred therefore to use knives with fixed gaps as in FIGURES 8 and 9 and to provide for a variation of the speed of the knife during the cycle. By making the speed of the knife constant during the interruption phase i.e. when the gap is passing over the web, and confining the variation to the incising phase, the uncut bridges will be constant for all adjustments and the variation will provide for variation in the length of the slit. Preferably the speed of the knife during the interruption phase is such that the length of the uncut bridges is substantially equal to the gap i.e. the ratio of the peripheral speed of the knife to the speed of the web is unity. This permits the gap to be shaped e.g. rounded and/or at such an angle as to give optimum conditions for the start and end of the incision and least danger of tearing the foil.

For one particular length of slit, determined by the diameter of the knife, the knife will rotate at constant speed, but for any other length, the ratio of the mean peripheral speed of the knife to the speed of the web will differ from unity and if the ratio is to be unity during the interruption phase, the rotation of the knife during the incising phase will need to include at least one sub-phase of acceleration and one sub-phase of deceleration. Similar considerations will apply if the ratio is fixed, though not unity, during the interruption phase. In the making of a meander pattern such as that of FIGURES 1 and 2 chosen as an example, since the gaps in adjacent knives will be relatively phased 180°, in the case of single gapped knives as in FIGURE 8 there will need to be two fixed ratio phases per revolution and two variable phases each with at least one sub-phase of acceleration and deceleration, and a correspondingly greater multiple of the fixed and two variable phases in the case of knives with more than one gap.

One suitable and preferred form of apparatus using circular knives and enabling the length of slit to be varied while maintaining the bridge length constant is shown in FIGURES 12 to 15.

A motor and gearbox unit 301 drives for example through chain gearing 302, 303 respectively, one of a pair of feed and crimping rollers 304, and the input side of a continuously variable speed gear 305. The output side shaft 306 of the gear 305 is journalled in a bearing 307 and on its end carries a grooved crank arm 308. The gear 305 and bearing 307 are mounted on a slide 309 movable on a slideway 311 by any convenient means such as a feed screw 312 controlled by a handle 313. For a reason to be explained the control of the gear 305 is also effected from the handle 313, for example through a chain gear 314 and the adjustment of the slide and gear may be indicated on a dial or the like 315. Instead of mounting the gear 305 on the slide 309, the shaft 306 could be provided with universal joints.

Engaging in the groove in the crank arm 308 is a crank pin 316 carried by a second crank arm 317 carried on the end of the input shaft of a change speed gear 318 having a multiplying ratio of 2n when n is the number of gaps in the knives. Manifestly the pin 316 could be carried by the crank arm 308 and arm 317 be grooved or other equivalent eccentric device be used. For the sake of simplicity single gapped knives to be described later are shown and the ratio is then 2 but knives with more than one gap (such as the knife shown in FIGURE 8) may be needed in some cases. As will be described, the knives are easily exchangeable individually, and the gear 318 may have several selectable ratios to suit knives of different number of gaps.

The output shaft 319 of the gear 318, which carries the knives 321 is non-circular in section to provide a driving engagement, at least over the length carrying the knives, and the knives can be threaded over the shaft laterally by means of a slot 322 formed by inwardly continuing the gap in the cutting edge of the knife to the requisite extent. If the knives have more than one gap, only one gap in each is continued inwardly in this way. By way of example the shaft 319 is shown as of rectangular section as this is simple and gives good support to the knives.

Alternate knives are threaded on from opposite sides so that their gaps are relatively displaced 180° in phase. When in place each knife is retained by a spring clip or the like which retains it firmly but enables it easily to be released for removal.

For example the clip may be a U-shaped spring 323 having both limbs bent over at 324 and engaging each in a recess 325. The walls of the recesses against which the ends of the spring shut are inclined so that the spring is urged towards the shaft, and the bent over portions 324 bear against the shaft, so avoiding any looseness.

Since with this construction of the shaft 319 alternate knives are threaded from opposite sides, it is essential that the number of gaps in the knife should be odd, otherwise the gaps in one knife would come in line with gaps in the adjacent knives and not midway between, as is required to produce a meander pattern. If some other section of shaft, e.g. triangular, were used, which enabled the alternate knives to be threaded at angles which are an odd sub-multiple of 350°, then an even number of gaps in each knife could be provided, but not a single gap.

The cutting edge and some width of the full thickness of each knife penetrates into a corresponding groove 326 in a grooved roller 327. The spacing centre to centre of the groove 326 is equal to the minimum spacing centre to centre of the slots of the pattern and corresponds to the minimum width of the arms of the pattern. During threading on of the knives guiding of them into the slots is facilitated by rods 328 supported on a bar 329 thus forming a comb-like guide. There is one rod 328 in line with each part of the roller 327 between the grooves 326, and they assist in guiding the knives and preventing binding of the knives against the sides of the grooves 326, the greater part of which are only of such width as to give small clearance to the knives, see FIGURE 14. Additional comb guides can be provided at other positions round the shaft 319 so that the knives are retained accurately on planes perpendicular to the axis of the grooved roller 326. One such further guide comprising rods 331 and a bar 332 is shown in the drawings. The comb guides themselves may be located axially by a part on the guide engaging a groove in the roller 327, thus ensuring the correct alignment in relation to the grooves. As before a knife can be mounted for every groove, every second groove, every third groove etc. to enable arm widths of the minimum or multiples thereof to be obtained.

of the minimum or multiples thereof to be obtained.

Obviously, since the grooved roller 327 is cylindrical, all the knives must be of the same diameter, but they need not all have the same number of gaps. For example, in a wide machine it may be desired to make several different patterns side by side over different parts of the width of the web. Then there may be a group of knives with say one gap, another group of knives with say three gaps, and another group with say five gaps. Comparatively large spaces may be left between the different groups to provide uncut margins of web between the corresponding patterns of slits. Subsequently, the web may be slit continuously along the centre line or other position within each wide unpatterned zone to separate the several patterns, but in other cases there may be different pattern distributions for different surface loading in different zones of the width.

It will be understood that where several different patterns are produced in this way, the cycle of motion of the knife shaft and ratio of the gear 318 must be suited to the lowest common multiple of the various numbers of gaps, so that the correct speed of the knives is obtained whenever a gap is passing over the web. There will then be an acceleration and deceleration between every gap passage over the web during one revolution of the shaft, but this will not interfere with the adjustment of the desired length of incision which will still depend on the adjustment of the slide 309.

The web 333 passes over the roller 327 and thence over a plain roller 334 having its periphery close to that of the roller 327. From the roller 334 it passes to the feed and crimping rollers 304. During passage over the roller 327 the web is slit and the margins folded over through 90° by the coaction of the knives and roller 326 just as in FIGURES 3 to 6 above described. Due to the narrow clearance between the knife 321 and the walls of the groove 326, a recess 335 is provided on each side to accommodate the thickness of the web.

To prevent the 90° folds produced by the action of the knives from unfolding when the folds have moved clear of the knives, plough members 336 which project into the space between the rollers 327 and 334, and extend along the grooves to a point near the knives, hold the folds in place. These ploughs widen into shoes 337 in the space between the rollers, and complete the folding over of the margins back on to the web. These shoes are shaped to allow free passage to the uncut bridges in the web. Practical considerations may make it difficult to carry the ploughs 336 close enough to the knives, and a pneumatic means such as a jet of air delivered to this zone by a nozzle 336 may be used to hold the 90° folds in place. It should here be mentioned that if the web is a plain metallic foil, the difficulty of a tendency to unfold may not arise, but if for example a foil has been laminated to a layer of paper, as described below, there is a more serious risk of a tendency to unfold. Air jets may be relied on to hold the 90° folds in place all the way to the point where the web leaves the roller 327, so that the ploughs can be omitted and only shoes be provided. It would even also be possible to replace the shoes by air jets. Cases may arise in which it is not desired to complete the folding, but to allow the 90° folds to unfold themselves under the elasticity of the material of the web. In that case the mechanical folding means constituted by the ploughs 334 and shoes 335 are taken out of action suitably by mounting these parts so that they can be swung about the axis of the roller 327, as indicated by the arrow. Taking of these parts out of action may also be necessary if a fault occurs which threatens to lead to tearing of the web or jamming. Pneumatic means can be put out of action simply by cutting off the air supply.

With the shaft 306 aligned with the input shaft to the gear 318, the coupling constituted by the crank arms 308, 317 and the pin 316 causes these two shafts to rotate in exact synchronism and if this speed is appropriate, the peripheral speed of the knife is equal to the speed of the web; these two speeds are both derived from the same source 301 and the gearing 302, 303, 305 determines their relationship.

If now the slide 309 is adjusted so that the shaft 306 is no longer aligned with the input shaft to the gear 318, although the two crank arms 308, 317 are still positively coupled by the pin 316 so that they must revolve at the same mean speed, it will be clear that their relative angular velocity must vary throughout a single revolution. Thus if as will be usual the shaft 306 and arm 308 rotate uniformly the arm 317 and the parts driven thereby will rotate non-uniformly. The variation will be smooth and the cycle will include a phase of acceleration and a phase of deceleration. At the two points in the cycle at which there is a change from acceleration to deceleration and vice versa, the angular velocity of the arm 317 will be practically constant over a short period and the timing in relation to the shaft 319 is arranged so that the gaps in the knives are passing over the web during one of these periods. Further the coupling of the adjustment of the gear 305 with that of the slide 309 can be arranged so that in all positions of adjustment the peripheral speed of the knife during these periods will be the same, so that the interruptions will always be of the same length and the adjustment of the slide will only change the length of the slits. The speed of the knife at the passage of the gaps is preferably equal to the speed of the web. (Strictly it can only be equal at one instant or at two instants which can be chosen to synchronise as nearly as possible with the termination and start of the incision.) Depending on which transition occurs at the passage of the gaps the slit will be shortened or lengthened as compared with constant speed and if the adjustment of the slide 309 can carry the one shaft to either side of the other a change from a shorter cut to a longer cut than that given when the shafts are aligned can be obtained.

In the machine as so far described, the feed of the web is imparted solely through the rollers 304. The web comes from a supply in roll form indicated at 339, and the necessary tension is imparted by friction bars 341, before it passes over the rollers 327 and 334, which are rotated by the web itself, as by this means the forces which the mechanically driven parts exert of the web on the one hand and the strength and dynamic force of the web itself, are balanced.

There is a lower limit to the strength of the web, with which this balancing of forces can be achieved. If the web is thinner than this limit, a complex electronically controlled drive can be used. Preferably, however, if the web is too weak, being for instance a very thin metallic foil, it may first be laminated at least on one side to a supporting material such as paper or a film of synthetic material, or be given a coating of varnish or the like. If such a layer is used on one side only, it is preferably arranged so that it is on the outside when the web is passing over roller 326, as in that case when the margins are folded over, this insulating layer will be on the outside and the conductive web in the folds will have the folded over margins in face to face contact.

As shown in FIGURE 7 and as above described, the knives are of symmetrical section, and the foil is slit midway over the grooves 326, so that equal margins are folded over on the sides of the slits. In particular cases, it may be desired to make the knives of asymmetric section, so that unequal margins are formed, or even as shown in FIGURE 9, to make the knives of such section that the cutting edge of the knife 321a is wholly to one side. Then only one margin will be folded over, and there need be only one recess 335a.

As above described, the interruptions or bridges extend in a line perpendicular to the length and direction of the movement of the web, and each repeat pattern is of generally rectangular outline. It may be desired that the bridges should extend across at a slope or in other words that the geenral outline of each repeat should be a non-rectangular parallelogram. This can readily be achieved by making the shaft 319 a steep helical form. If it is desired to be able to adjust the helix angle, the shaft may be made flexible in torsion.

One arrangement is shown as FIGURE 10. The shaft here comprises an inner member 319a and an outer member 319b, which consists of a spiral spring with square shaped turns seated on the inner member 319a. The spring is desirably made of rectangular section strip wound with the turns close together. Such a spring can be twisted more or less, and is provided with some means for locking it, for example by compression from the ends between a shoulder and a nut. The member 319a can be solid or hollow.

Another possibility is illustrated in FIGURE 11. Here, the shaft itself is springy, being made up of a pack of thin leaf springs 319c, these being well lubricated. For the sake of clearness, the springs are shown thicker than would actually be used, and there would therefore be a larger number of them. Again, some means is provided for locking the shaft when the necessary twist has been imparted.

For example, the shaft at points beyond the length which carries the knives may have keyed to it a gear wheel. These gear wheels mesh with two other gear wheels keyed to a shaft journalled to be free to rotate which can be moved to unmesh the wheels. While they are unmeshed the desired twist is imposed on the shaft and the wheels are then re-meshed, thus maintaining the desired angular relationship between the ends of the shaft. The gear wheels must be of such size that the second mentioned shaft clears the knives and any other part of the apparatus which might otherwise be in the way. Alternatively, a circular section, solid or hollow shaft could traverse the pack of leaf springs and carry U-clips, which after adjustment of the twist can be locked on the ends of the pack of leaf springs by the action of a shoulder at one end and a nut at the other.

With these adjustable shafts, the slots 322 in the knives are made a loose fit, so that they can accommodate a range of twist of the shaft. With such twisted shafts the exact phase relationship of the gaps to the motion cycle will vary along the shaft, so that there will be a variation in the length of the bridges across the web, but it will be very small in practical cases and is kept to a minimum by arranging that the knife at mid-length of the shaft is correctly phased.

More elaborate variations of the pattern of bridges can be achieved by other forms of shaft having the cross section by which the angular disposition of the knives is determined varying or variable along the length of the shaft. Such a shaft may have the angular disposition varying or variable in steps equal to the minimum spacing of the knives. Such a shaft may be made up of rectangular blocks threaded in a central shaft at the desired phase angles and clamped together, as by a shoulder at one end and a nut at the other. In such a case if the total phase variation is substantial, it will be best to rotate the shaft at constant speed and accept the proportionate change in the length of the bridges or correct these by using knives with variable gaps as in FIGURES 10 and 11 where adjustment is made between the relative speed of the shaft and web to change the length of the slits, as described above with reference to FIGURES 5 and 6. In some cases, however, it may be possible to use a repeating cycle of motion per revolution which gives constant bridge length with variable slit length.

The various parts of the machine are arranged to facilitate examination and exchange. As above explained, the knives are easily removed and replaced individually, for example, for resharpening. The shaft unit as a whole can be mounted so that it can be moved towards and away from the roller 326. The mounting of the ploughs and shoes enables them to be adjusted and also enables them to be moved into a position in which the operative ends are accessible for examination.

Slitting and folding can be facilitated by lubricating the web. This can conveniently be done by a roller 342 positioned near the tensioning bars 341. After the patterned web has emerged from the crimping rollers 304 it may pass to equipment such as that described above with reference to FIGURES 3 to 6 for lamination to other materials. In this case, the lubricant should be compatible with the materials with which the web is coated or laminated before or following slitting. It may be a liquid which can be driven off by heat when the web emerges from the crimping rollers 304 or which could serve as a solvent or plasticizer of the solid content of an adhesive by which the subsequent lamination is effected, or be a solvent or plasticiser of or otherwise compatible with a plastic film to which the web is subsequently laminated.

It is to be understood that in this specification "crimping" means having undulations disposed perpendicularly to the general surface of the foil and of such character that there is substantially no change in the thickness of the foil when the crimping is effected. This form of crimping is in itself known and can be effected by running the foil between two rollers having intermeshing teeth of pitch appropriate to the pitch of the crimps desired. Such crimping confers extensibility to the foil far beyond any such quality possessed by the foil in the flat and it enables the foil to be distorted somewhat in its own place without damage and generally to be handled without damage notwithstanding its thinness.

What I claim is:
1. A method of producing a series of interrupted longitudinal slits of variable length in a web, without the need to exchange the cutting tool and without the need to keep a constant relation between the length of the slit and the length of the interruption, including the steps of feeding the web longitudinally through a cutting station, and while the web is in motion through the station, imparting a repeating cycle of movements to a knife having a cutting edge with at least one gap therein, said cutting edge being disposed in a longitudinal plane, said cycle including a movement of the knife in said longitudinal plane in fixed ratio to the movement of the web while the gap in the cutting edge is passing over the web and a movement of the knife in said longitudinal plane controllable independently of the movement of the web while the cutting edge makes an incision in the web.

2. A method as set forth in claim 1 in which during that phase of the cycle in which the gap is passing over the web, at at least one end of the incision, the longitudinal component of the speed of the knife is substantially equal to the speed of the web and the relative movement between the cutting edge of the knife and the web is substantially perpendicular to the web.

3. A method as set forth in claim 1 in which during the phase of the cycle in which the knife is making the incision, at least one acceleration and one deceleration are included in the movement of the knife.

4. A method as set forth in claim 1 in which the motion imparted to the knife is always in the same direction during at least one cycle whereby the incision is started by one end of the cutting edge and terminated at the other end of the cutting edge, while provision is made to regulate the mean speed of the knife during the cycle in relation to the speed of the web.

5. A method as set forth in claim 1 which includes prior to the incision of the web, the step of reinforcing the web by adhesive application of another material to substantially the whole area of the web.

6. A method as set forth in claim 1 is which the web is held under tension during incision.

7. A method as set forth in claim 1 which includes prior to the incision of the web, the step of lubricating the web with a lubricant compatible with any other materials with which the web is in adhesive surface contact during the complete cycle of operations.

8. A method as set forth in claim 1 in which the web is supported at the cutting station by a grooved support with substantially square corners at the groove openings, but the knife is carried far enough through the web and into the groove to fold at least one margin of the web through an angle not exceeding 90 degrees and thereafter while the folded margin is still in the groove, the web is carried into the field of action by means capable of continuing the folding of such margin, such means being controllable in the extent of its action on the folded margin.

9. A method as set forth in claim 8 in which said means completes the folding over of the margin to a position parallel with the unfolded part of the web, thereby converting the slits into slots.

10. A method of producing a meander pattern in which a plurality of similar series of slots are simultaneously produced side by side, each by the method set forth in claim 9 with the interruptions of alternate series of slots longitudinally staggered.

11. A method of making an electrical heating film having a pattern of slots which includes the steps of drawing a web of electrically conductive foil longitudinally from a supply, slitting the foil in a pattern of longitudinal slits corresponding to the required pattern of slots and by the slitting operation itself folding at least one margin of each slit through about 90 degrees, and completing folding of the margin through 180 degrees immediately thereafter.

12. A method as set forth in claim 11 in which the foil is drawn continuously from the supply and the succeeding operations are effected progressively as the foil moves.

13. A method as set forth in claim 11 in which the foil is carried in a curved path during slitting and folding is effective towards the concave side of the curved path while after leaving said curved path the foil enters a second curved path of reverse curvature thereby bringing the folded margins on to the convex side of the second path.

14. A method as claimed in claim 13 including the step of applying pressure to supplement the natural tension tending to flatten down the folded margins in the traverse of the second path.

15. A method as set forth in claim 14 including the further step of crimping the foil after folding of the margins.

16. A method as set forth in claim 11 including the step of pressing an insulating sheet against at least one side of the surfaces of the foil and feeding the foil and insulating sheet forward simultaneously, and heating the insulating sheet while it is pressed against the foil, the insulating sheet having a surface which is rendered adherent by heat.

17. A method as set forth in claim 16 in which the heat is provided by a supply of current to the foil pattern itself.

References Cited

UNITED STATES PATENTS

| | | | |
|---|---|---|---|
| 2,087,573 | 7/1937 | Hamilton | 29—610 |
| 2,401,472 | 6/1946 | Franklin | 336—208 |
| 2,701,613 | 2/1955 | Bishop | 83—332 |
| 2,837,978 | 6/1958 | Anderson | 83—332 X |
| 2,891,303 | 6/1959 | Stevenson | 338—280 X |
| 2,997,904 | 8/1961 | Gotsch et al. | 83—37 |
| 3,031,745 | 5/1962 | Dzialo | 83—332 X |
| 3,086,416 | 4/1963 | Minarik | 83—346 X |
| 3,162,076 | 12/1964 | Emerson et al. | 83—78 X |

FOREIGN PATENTS

| | | |
|---|---|---|
| 584,588 | 10/1959 | Canada. |
| 639,206 | 12/1936 | Germany. |

JOHN F. CAMPBELL, *Primary Examiner.*

J. L. CLINE, *Assistant Examiner.*